(12) United States Patent
Arthur et al.

(10) Patent No.: US 12,165,050 B2
(45) Date of Patent: Dec. 10, 2024

(54) NETWORKS FOR DISTRIBUTING PARAMETERS AND DATA TO NEURAL NETWORK COMPUTE CORES

(71) Applicant: INTERNATIONAL BUSINESS MACHINES CORPORATION, Armonk, NY (US)

(72) Inventors: John V. Arthur, Mountain View, CA (US); Brian Taba, Cupertino, CA (US); Rathinakumar Appuswamy, San Jose, CA (US); Andrew S. Cassidy, San Jose, CA (US); Pallab Datta, San Jose, CA (US); Steven K. Esser, San Jose, CA (US); Myron D. Flickner, San Jose, CA (US); Jennifer Klamo, San Jose, CA (US); Dharmendra S. Modha, San Jose, CA (US); Hartmut Penner, San Jose, CA (US); Jun Sawada, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1281 days.

(21) Appl. No.: 16/157,878

(22) Filed: Oct. 11, 2018

(65) Prior Publication Data
US 2020/0117988 A1  Apr. 16, 2020

(51) Int. Cl.
*G06N 3/08* (2023.01)
*G06N 3/04* (2023.01)
*G06N 3/063* (2023.01)

(52) U.S. Cl.
CPC .............. *G06N 3/08* (2013.01); *G06N 3/04* (2013.01); *G06N 3/063* (2013.01)

(58) Field of Classification Search
CPC ............ G06N 3/08; G06N 3/04; G06N 3/063; G06N 3/0481; G06N 3/481; G06N 5/04
See application file for complete search history.

(56) References Cited

U.S. PATENT DOCUMENTS

| 9,646,243 B1* | 5/2017 | Gokmen | G06N 3/08 |
| 10,699,189 B2* | 6/2020 | Lie | G06N 3/10 |
| 2003/0014378 A1* | 1/2003 | Goodnight | G06N 3/045 |
| | | | 706/26 |

(Continued)

OTHER PUBLICATIONS

Akopyan, Filipp, et al. "Truenorth: Design and tool flow of a 65 mw 1 million neuron programmable neurosynaptic chip." IEEE transactions on computer-aided design of integrated circuits and systems 34.10 (2015): 1537-1557. (Year: 2015).*

(Continued)

*Primary Examiner* — Randall K. Baldwin
(74) *Attorney, Agent, or Firm* — Erik A. Huestis; Sameer K. Pai; Foley Hoag LLP

(57) ABSTRACT

Networks for distributing parameters and data to neural network compute cores. In various embodiments, a neural inference chip comprises a plurality of neural cores and at least one network interconnecting the plurality of neural cores. Each of the plurality of neural cores is adapted to apply a plurality of synaptic weights to a plurality of input activations to produce a plurality of output activations. The at least one network is adapted to simultaneously deliver synaptic weights and/or input activations to the plurality of neural cores.

22 Claims, 12 Drawing Sheets

(56) References Cited

U.S. PATENT DOCUMENTS

| | | | |
|---|---|---|---|
| 2004/0193558 A1* | 9/2004 | Nugent | G06N 3/063 |
| | | | 977/839 |
| 2015/0058268 A1* | 2/2015 | Modha | G06N 3/063 |
| | | | 706/27 |
| 2016/0004961 A1* | 1/2016 | Appuswamy | G06N 3/049 |
| | | | 706/26 |
| 2016/0196488 A1* | 7/2016 | Ahn | G06N 3/049 |
| | | | 706/41 |
| 2016/0224889 A1 | 8/2016 | Alvarez Icaza Rivera et al. | |
| 2017/0277658 A1 | 9/2017 | Pratas et al. | |
| 2018/0285254 A1* | 10/2018 | Baum | G06N 3/063 |
| 2018/0285718 A1* | 10/2018 | Baum | G06N 3/02 |
| 2018/0285727 A1* | 10/2018 | Baum | G06N 3/0454 |
| 2019/0019564 A1* | 1/2019 | Li | G11C 16/0466 |
| 2019/0042191 A1* | 2/2019 | Langhammer | G06F 7/5443 |
| 2019/0050717 A1* | 2/2019 | Temam | G06F 17/16 |
| 2019/0102669 A1* | 4/2019 | Chen | G06N 3/049 |
| 2019/0180170 A1* | 6/2019 | Huang | G06F 13/4068 |
| 2019/0205740 A1* | 7/2019 | Judd | G06N 3/048 |
| 2019/0286973 A1* | 9/2019 | Kovvuri | G06N 3/04 |
| 2019/0325289 A1* | 10/2019 | Cammarota | G06N 3/044 |
| 2019/0385046 A1* | 12/2019 | Cassidy | G06F 15/8092 |
| 2020/0004993 A1* | 1/2020 | Volos | H04L 63/12 |
| 2021/0255860 A1* | 8/2021 | Morrison | G06N 3/084 |
| 2022/0351045 A1* | 11/2022 | Nugent | G11C 13/003 |

OTHER PUBLICATIONS

Esser, Steven K., et al. "Convolutional networks for fast, energy-efficient neuromorphic computing." Proceedings of the national academy of sciences 113.41 (2016): 11441-11446. (Year: 2016).*

Sawada, Jun, et al. "Truenorth ecosystem for brain-inspired computing: scalable systems, software, and applications." SC'16: Proceedings of the International Conference for High Performance Computing, Networking, Storage and Analysis. IEEE, 2016: 130-141 (Year: 2016).*

Bako, László. "Real-time clustering of datasets with hardware embedded neuromorphic neural networks." 2009 International Workshop on High Performance Computational Systems Biology. IEEE, 2009: 13-22 (Year: 2009).*

Nere, Andrew, Atif Hashmi, and Mikko Lipasti. "Profiling heterogeneous multi-GPU systems to accelerate cortically inspired learning algorithms." 2011 IEEE International Parallel & Distributed Processing Symposium. IEEE, 2011: 906-920 (Year: 2011).*

Appuswamy, Rathinakumar, et al. "Structured convolution matrices for energy-efficient deep learning." arXiv preprint arXiv: 1606. 02407 (2016): 1-17 (Year: 2016).*

Qi, Yangjie, et al. "Socrates-D: Multicore architecture for on-line learning." 2017 IEEE International Conference on Rebooting Computing (ICRC). IEEE, 2017. (Year: 2017).*

Davies, Mike, et al. "Loihi: A neuromorphic manycore processor with on-chip learning." IEEE Micro 38.1 (Feb. 2018): 82-99. (Year: 2018).*

Akbari et al., "A High-Performance Network-on-Chip Topology for Neuromorphic Architectures," 2017 IEEE International Conference on Computational Science and Engineering (CSE) and IEEE International Conference on Embedded and Ubiquitous Computing (EUC) (2017).

Firuzan et al., "Reconfigurable Communication Fabric for Efficient Implementation of Neural Networks," 2015 10th International Symposium on Reconfigurable Communication-centric Systems-on-Chip (ReCoSoC) (2015).

* cited by examiner

NETWORKS FOR DISTRIBUTING PARAMETERS AND DATA TO NEURAL NETWORK COMPUTE CORES

BACKGROUND

Embodiments of the present disclosure relate to multi-core hardware implementations of neural networks, and more specifically, to networks for distributing parameters and data to neural network compute cores.

BRIEF SUMMARY

According to embodiments of the present disclosure, neural inference chips are provided. In various embodiments, a neural inference chip comprises a plurality of neural cores and at least one network interconnecting the plurality of neural cores. Each of the plurality of neural cores is adapted to apply a plurality of synaptic weights to a plurality of input activations to produce a plurality of output activations. The at least one network is adapted to simultaneously deliver synaptic weights and/or input activations to the plurality of neural cores.

According to embodiments of the present disclosure, methods of and computer program products for operating a neural network are provided. In various embodiments, synaptic weights are simultaneously delivered by at least one network of a neural inference chip to a plurality of neural cores of the neural inference chip. Input activations are simultaneously delivered by at least one network of a neural inference chip to a plurality of neural cores of the neural inference chip. A plurality of synaptic weights is applied to a plurality of input activations by each of the plurality of neural cores to produce a plurality of output activations. The output activations are sent via the at least one network.

DETAILED DESCRIPTION

Figure 1:
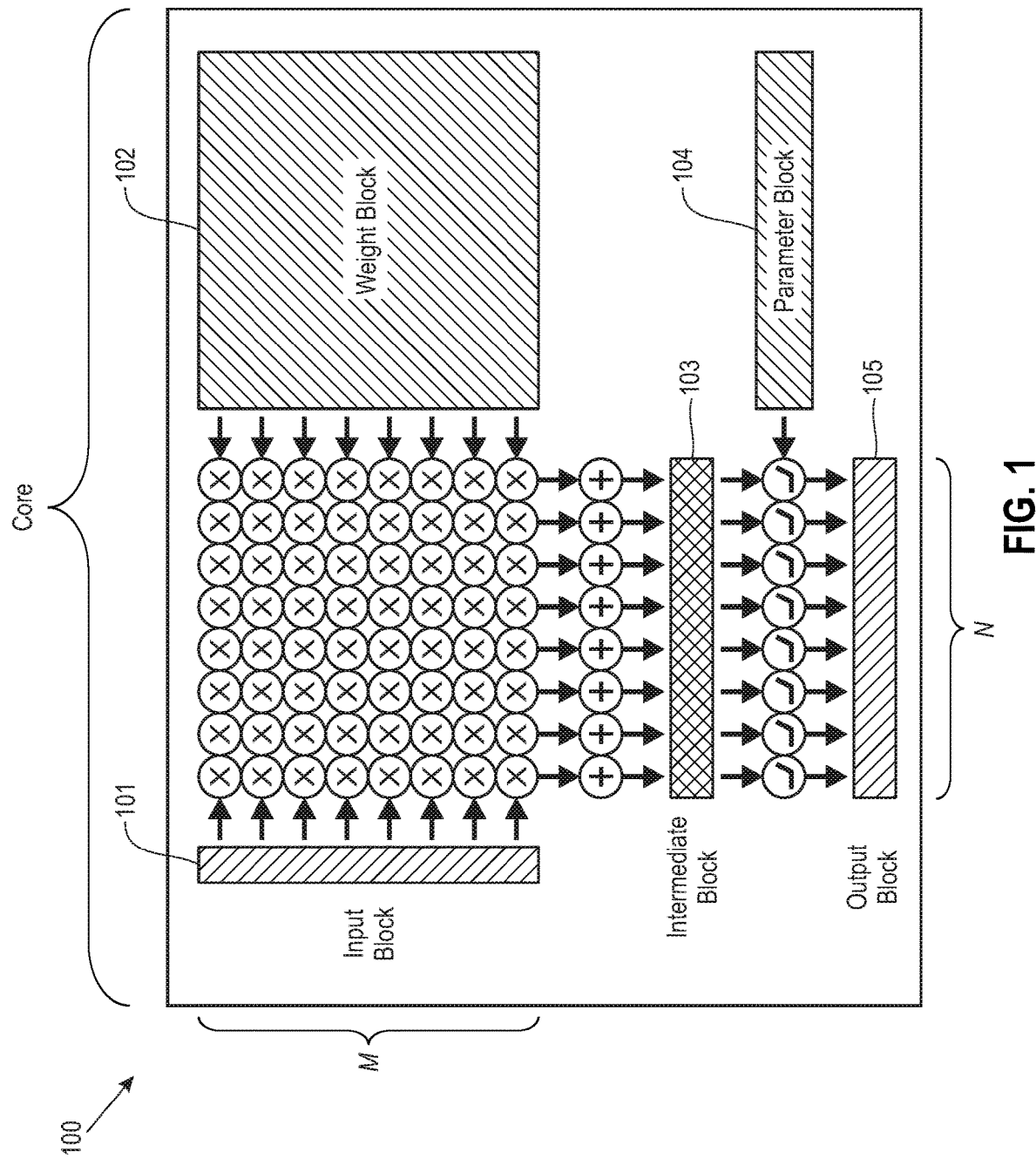
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions σ in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function σ.

An element of a layer's output data tensor Y can be computed as in Equation 1 where the neuron activation function σ is configured by the vector of activation function parameters V [i,j,k,:], and the weighted sum Z[i,j,k] can be computed as in Equation 2.

$$Y[i, j, k] = \sigma(V[i, j, k, :]; Z[i, j, k]) \quad \text{Equation 1}$$

$$Z[i, j, k] = \sum_{a=1}^{A}\sum_{b=1}^{B}\sum_{c=1}^{C} W[i, j, k, a, b, c] \cdot X[a, b, c] \quad \text{Equation 2}$$

For simplicity of notation, the weighted sum in Equation 2 may be referred to as the output, which is equivalent to using a linear activation function $Y[i,j,k]=\sigma(Z[i,j,k])=Z[i,j,k]$, with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

As hardware neural network implementations are inherently interconnected, efficiently moving data to and among processing elements (such as neural cores) is an important aspect of performance. As described above, neural networks need to communicate activations (layer input and outputs) among cores and need to receive parameters.

For example, to compute a single neuron activation, the neuron needs to receive activations from all (or a subset) of neurons in the previous layer. Further, the neuron needs to receive parameters (including weights and biases) that it will use to compute outputs based on its inputs.

The present disclosure provides various hardware networks for neural network input, output, and internal activation communication. These approaches enable hardware neural network substrates to communicate neural network parameters, on a per core or broadcast basis. This is particularly useful for convolutional neural networks, where parameters are shared. This approaches also allow communication of activations or partial sums among cores.

With reference now to FIG. 1, a neural core according to embodiments of the present disclosure is depicted. A neural core 100 is a tileable computational unit that computes oneblock of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block 104 contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
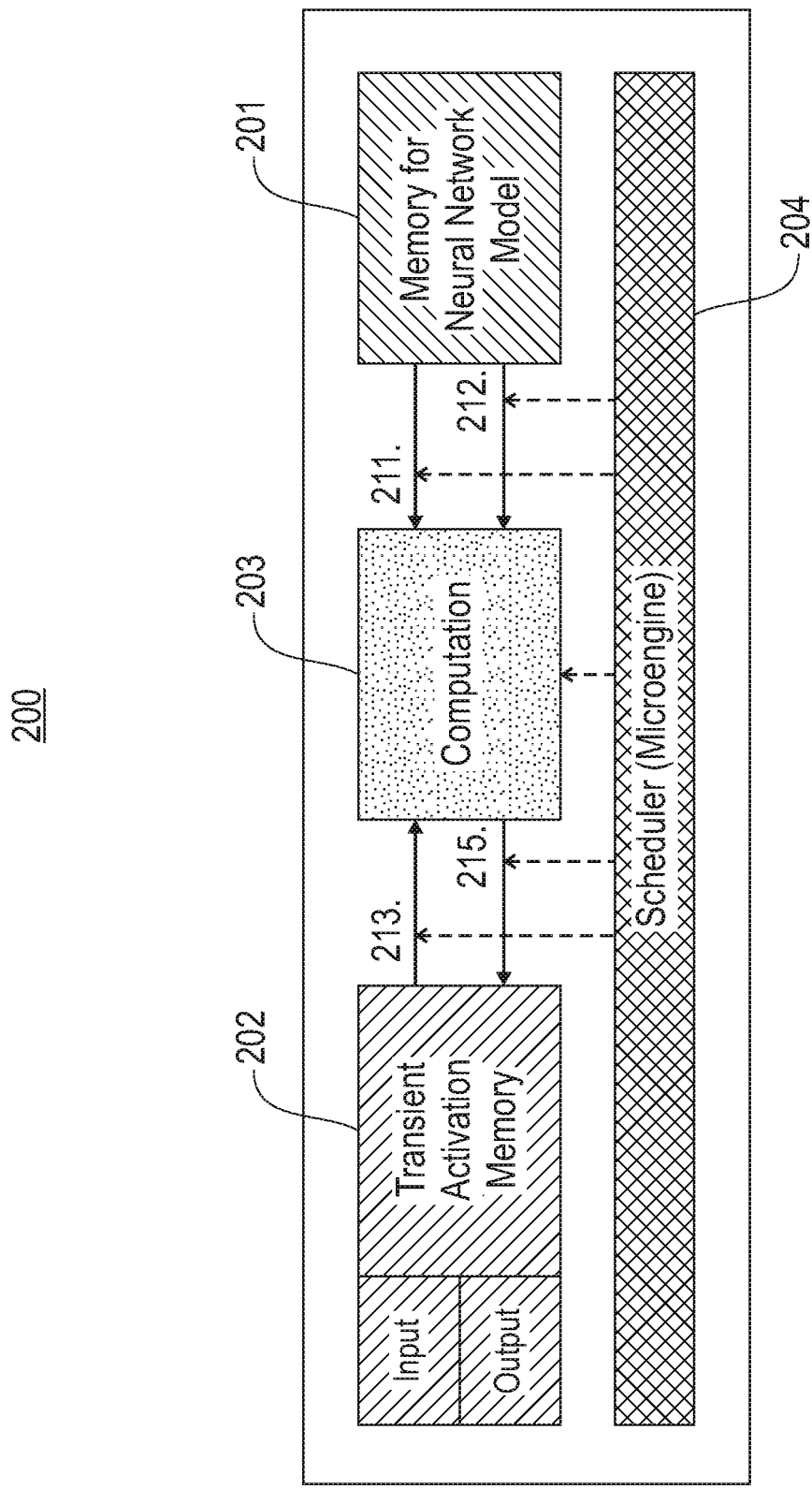
FIG. 2 illustrates an exemplary Inference Processing Unit (IPU) according to embodiments of the present disclosure.

Referring to FIG. 2, an exemplary Inference Processing Unit (IPU) is illustrated according to embodiments of the present disclosure. IPU 200 includes a memory 201 for the neural network model. As described above, the neural network model may include the synapse weights for a neural network to be computed. IPU 200 includes an activation memory 202, which may be transient. Activation memory 202 may be divided into input and output regions, and stores neuron activations for processing. IPU 200 includes a neural computation unit 203, which is loaded with a neural network model from model memory 201. Input activations are provided from activation memory 202 in advance of each computation step. Outputs from neural computation unit 203 are written back to activation memory 202 for processing on the same or another neural computation unit.

In various embodiments a scheduler 204 is included in IPU 200. In such embodiments, all operations in the IPU are directed by the scheduler. As set out below, central and/or distributed schedulers may be provided in various embodiments. A global scheduler may be referred to as a chip microengine, while a local scheduler may be referred to as a core microengine or local controller. In various embodiments a scheduler comprises one or more microengines, microcontrollers, state machines, CPUs, or other controllers.

Figure 3:
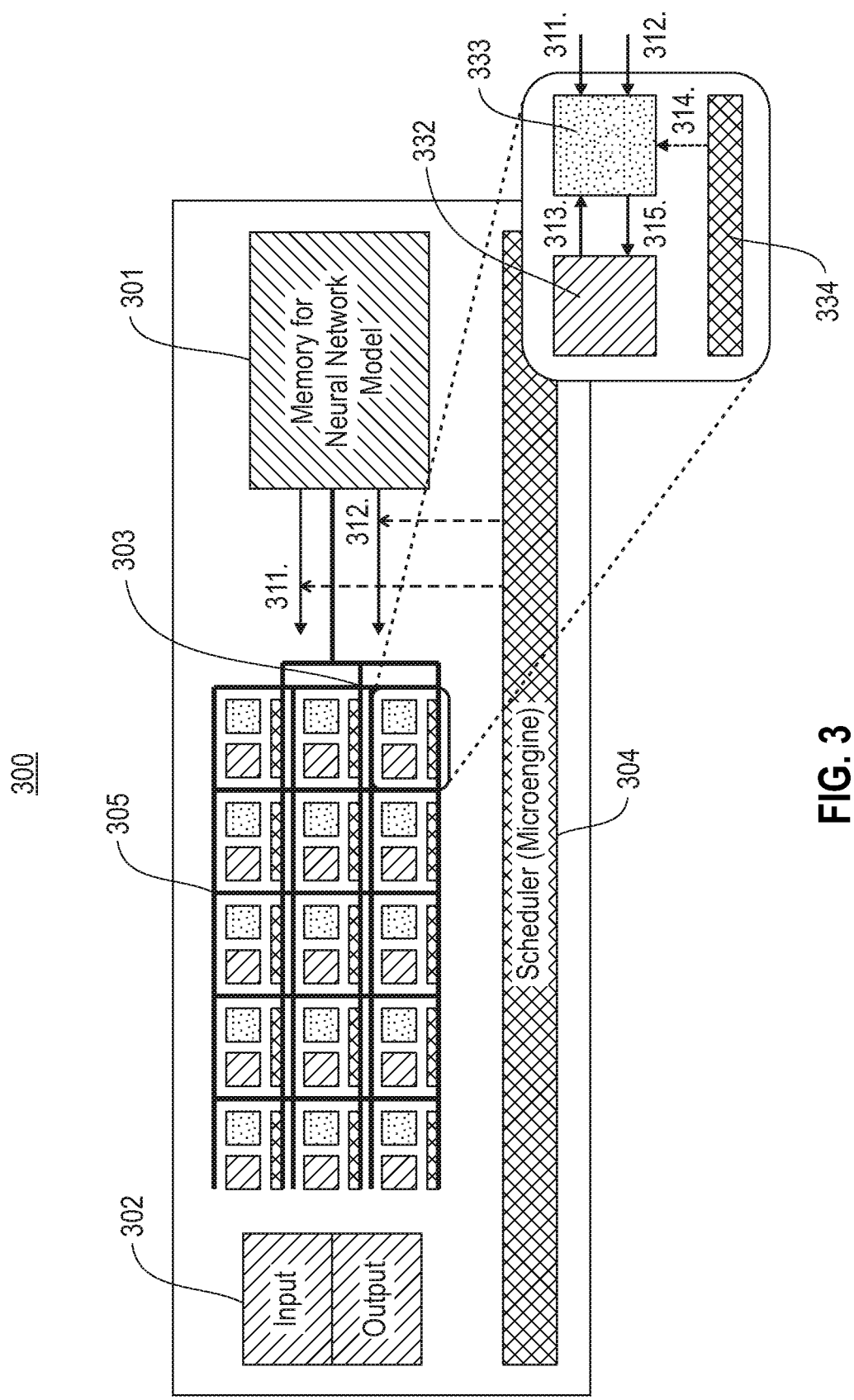
FIG. 3 illustrates a multi-core Inference Processing Unit (IPU) according to embodiments of the present disclosure.

Referring to FIG. 3, a multi-core Inference Processing Unit (IPU) is illustrated according to embodiments of the present disclosure. IPU 300 includes a model memory 301 for the neural network model. As described above, the neural network model may include the synapse weights for a neural network to be computed. IPU 300 includes an activation memory 302, which may be transient. Activation memory 302 may be divided into input and output regions, and stores neuron activations for processing. In some embodiments, IPU 300 includes an instruction memory 307 for storing chip-level instructions.

IPU 300 includes a plurality of cores 303 in an array 305. Each core 303 includes a neural computation unit 333, which is loaded with a neural network model from model memory 301. Each core also include a local activation memory 332. Input activations are provided from local activation memory 332 in advance of each computation step. Outputs from neural computation unit 333 are written back to activation memory 332 for processing on the same or another neural computation unit.

In various embodiments a global scheduler 304 is included in IPU 300. In various embodiments, a local core controller 334 is included on each core 303. In such embodiments, the direction of operations is shared between the global scheduler (chip microengine) and the local core controller (core microengine). In some embodiments, a chip-level instruction memory 306 is provided for storing chip-level instruction for execution by chip microengine 304. In some embodiments, core 303 includes a core-level instruction memory 336 for storing core-level instructions for execution by core microengine 334.

IPU 300 includes one or more network-on-chip (NoC) 305. In some embodiments, a partial sum NoC 351 interconnects the cores 303 and transports partial sums among them. In some embodiments, a separate parameter distribution NoC 352 connects cores 303 to memory 401 for distributing weights and instructions to cores 303. It will be appreciated that various configurations of NoC 351 and 352 are suitable for use according to the present disclosure. For example, broadcast networks, row broadcast networks, tree networks, and switched networks may be used.

At 311, compute instructions are loaded from instruction memory 301 to each core 303 by global scheduler 304. At 312, parameters (e.g., neural network/synaptic weights) are loaded from model memory 301 to each core 303 by global scheduler 304. At 313, neural network activation data are loaded from data memory 302 to each core 303 by global scheduler 304. At 314, the cores in matrix 305 perform computation to generate output neuron activations. In particular, the computation comprises applying the input synaptic weights to the input activations. It will be appreciated that various methods are available for performing such computations, including in silico dendrites, as well as vector multiplication units. At 315, the results from computation are stored in data memory 302. These stages may be pipelined, in order to provide efficient usage of the neural computation unit on each core.

It will be appreciated that inputs and outputs may be transferred from local activation memory 332 to global activation memory 302 according to the requirements of a given neural network. Likewise, the model memory and instruction memory may have both chip-level and core-level components. At the core level, at 341, compute instructions are loaded to local instruction memory 336. At 342, parameters (e.g., neural network/synaptic weights) are loaded to model memory 331. At 343, neural network activation data are loaded to data memory 332. At 344, the computation unit 332 computed output activations or partial sums. At 345, the results from computation are outputted from data memory 332. These stages may be pipelined, in order to provide efficient usage of each core.

Figure 4:
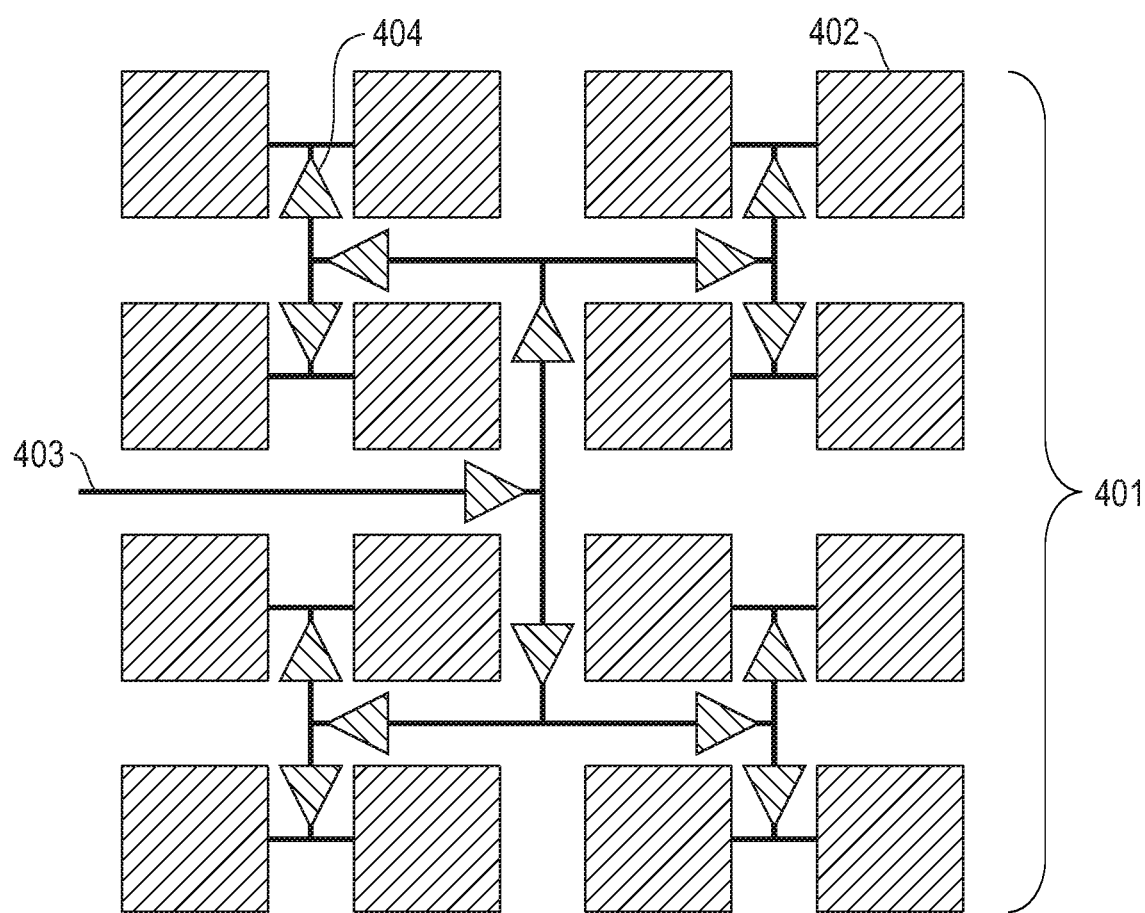
FIG. 4 illustrates an exemplary tree network topology according to embodiments of the present disclosure.

Referring to FIG. 4, an exemplary tree network topology is illustrated according to embodiments of the present disclosure. In this exemplary embodiment, core array 401 includes cores 402, which are interconnected by network 403. In some embodiments, network 403 includes buffers 404.

A tree network may be configured for broadcast, where multiple cores need the same message (at the same or different times). In such embodiments, parameters are sent serially or in parallel on a tree that forks (for example by 2 or 4) at each level; a binary tree requires 10 levels to reach 1024 destination nodes.

A tree network may be configured for targeted message delivery, where each message is targeted for a single core (a message may be sent more than once to target multiple cores). In such embodiments, parameters are sent serially or in parallel on a tree that forks (for example by 2 or 4) at each level; a binary tree requires 10 levels to reach 1024 destination nodes. To target a core, an address is used. For example, 10 bits may specify which path to take at each node of a 10-level binary tree, or an address may specify which core should accept the message and all others ignore it.

This exemplary network delivers up to 1 message/cycle and has latency proportional to log(N×N) for N×N total cores. As pictured, a buffer is placed at every branch. This network configuration enables broadcast to all cores. In some embodiments, a control is provided at every branch to route/filter messages.

This configuration is particularly useful for delivering same parameters to all/many cores, especially for convolutional networks where the same filter is applied to all spatial locations.

Figure 5:
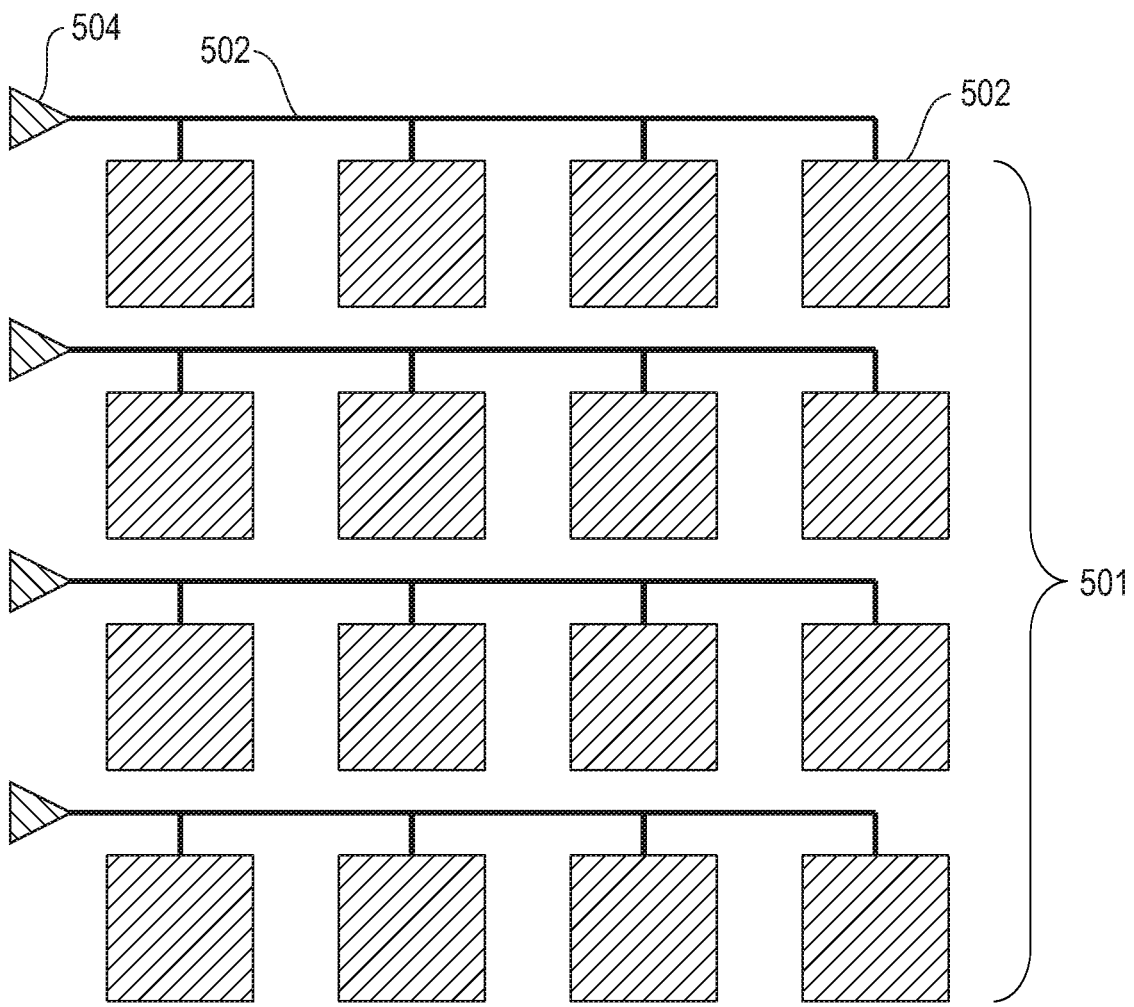
FIG. 5 illustrates an exemplary row/column bus network topology according to embodiments of the present disclosure.

Referring to FIG. 5, an exemplary row/column bus network topology is illustrated according to embodiments of the present disclosure. In this exemplary embodiment, core array 501 includes cores 502, which are interconnected by networks 503. In some embodiments, networks 503 include buffers 504.

A row/column bus network may be configured for broadcast, where multiple cores need the same message (at the same or different times). In such embodiments, parameters are sent serially or in parallel on a bus that broadcasts to a whole row simultaneously; for a N×N grid of cores N different messages can be sent simultaneously, 1 per row.

A row/column bus network may be configured for targeted message delivery, where each message is targeted for a single core (a message may be sent more than once to target multiple cores). In such embodiments, parameters are sent serially or in parallel on a bus that broadcasts to a whole row simultaneously; for a N×N grid of cores N different messages can be sent simultaneously, 1 per row. To target a core, an address is used, specifying which core should accept the message, and all others ignore it.

This exemplary network delivers up to 1 message/cycle with latency proportional to N for $N^2$ total cores arranged as N rows by N columns (that is, latency depends on wire speeds). This network configuration enables broadcast to all cores in a row. In some embodiments, a control is provided at every destination to filter messages.

This configuration is particularly useful for delivering the same parameters to all/many cores in each row, especially for convolutional networks where the same filter is applied to all spatial location. By delivering different messages to each row, more messages can be delivered per cycle.

Figure 6:
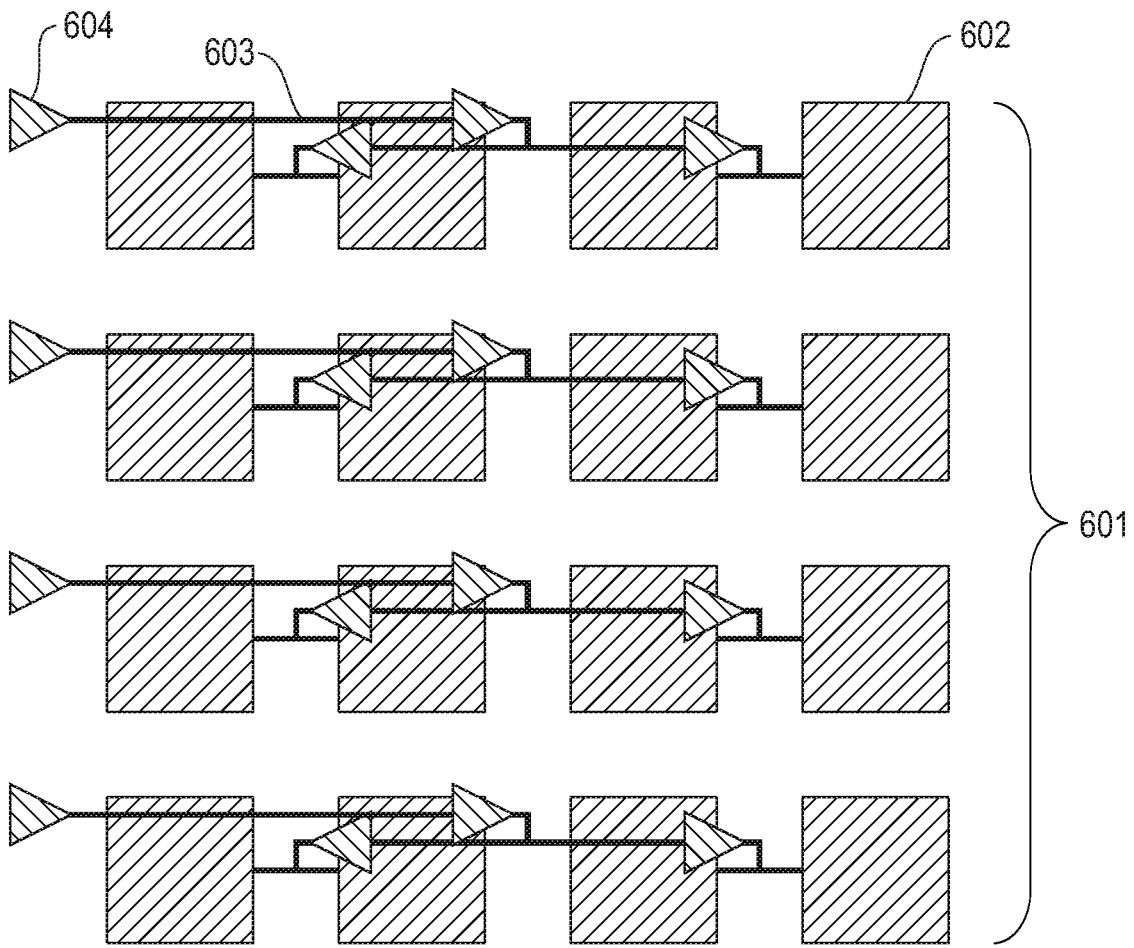
FIG. 6 illustrates an exemplary row/column tree network topology according to embodiments of the present disclosure.

Referring to FIG. 6, an exemplary row/column tree network topology is illustrated according to embodiments of the present disclosure. In this exemplary embodiment, core array 601 includes cores 602, which are interconnected by networks 603. In some embodiments, networks 603 include buffers 604.

A row/column tree network may be configured for broadcast, where multiple cores need the same message (at the same or different times). In such embodiments, parameters are sent serially or in parallel on a tree that forks (for example by 2 or 4) at each level, broadcasting to a whole row simultaneously; for a N×N grid of cores N different messages can be sent simultaneously, 1 per row.

A row/column tree network may be configured for targeted message delivery, where each message is targeted for a single core (a message may be sent more than once to target multiple cores). In such embodiments, parameters are sent serially or in parallel on a tree that forks (for example by 2 or 4) at each level, broadcasting to a whole row simultaneously; for a N×N grid of cores N different messages can be sent simultaneously, 1 per row. To target a core, an address is used.

This exemplary network delivers up to 1 message/cycle with latency proportional to log(N) for $N^2$ total cores arranged as N rows by N columns (that is, latency depends on wire speeds). This network configuration enables broadcast to all cores in a row. In some embodiments, a control is provided at every destination to filter messages.

This configuration is particularly useful for delivering the same parameters to all/many cores in each row, especially for convolutional networks where the same filter is applied to all spatial location. By delivering different messages to each row, more messages can be delivered per cycle.

Figure 7:
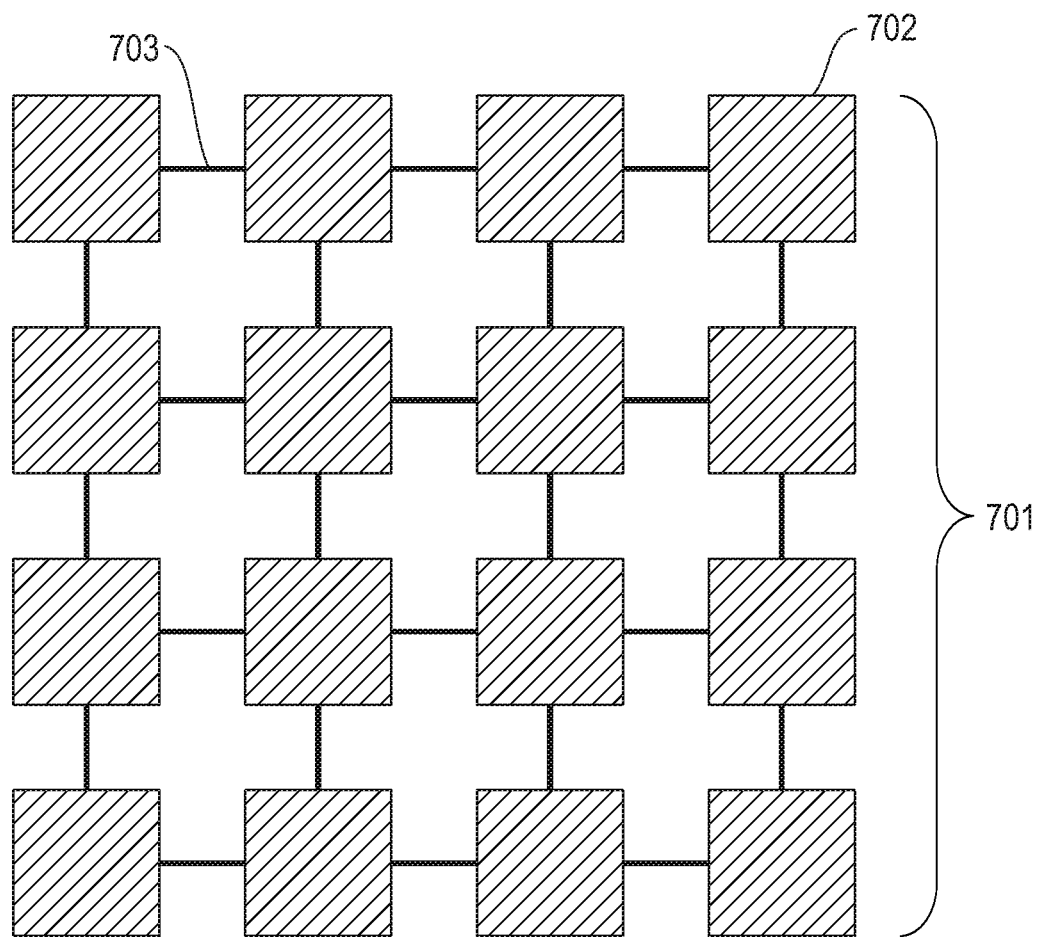
FIG. 7 illustrates an exemplary mesh network topology according to embodiments of the present disclosure.

Referring to FIG. 7, an exemplary mesh network topology is illustrated according to embodiments of the present disclosure. In this exemplary embodiment, core array 701 includes cores 702, which are interconnected by network 703.

A mesh network may be configured for broadcast, where multiple cores need the same message (at the same or different times). In such embodiments, parameters are sent serially or in parallel on a link that sequentially targets a set of cores on a row at a time, then is shifted to the next set. For parameters to arrive simultaneously queues are needed in all but the last cores to receive the message; for a N×N grid of cores N different messages can be sent simultaneously, 1 per row.

A mesh network may be configured for targeted message delivery, where each message is targeted for a single core (a message may be sent more than once to target multiple cores). In such embodiments, parameters are sent serially or in parallel on a link that sequentially targets a set of cores on a row at a time, then is shifted to the next set. For parameters to arrive simultaneously queues are needed in all but the last cores to receive the message; for a N×N grid of cores N different messages can be sent simultaneously, 1 per row. To target a core, an address is used to specify the path to the destination core.

This exemplary network delivers up to 1 message/cycle with latency proportional to N for $N^2$ total cores arranged as N rows by N columns (that is, latency depends on wire speeds). This network configuration enables targeting individual cores.

This configuration is particularly useful for delivering unique parameters/messages to cores, especially for fully connected networks where each neuron has a unique set of weights/biases.

Figure 8A:
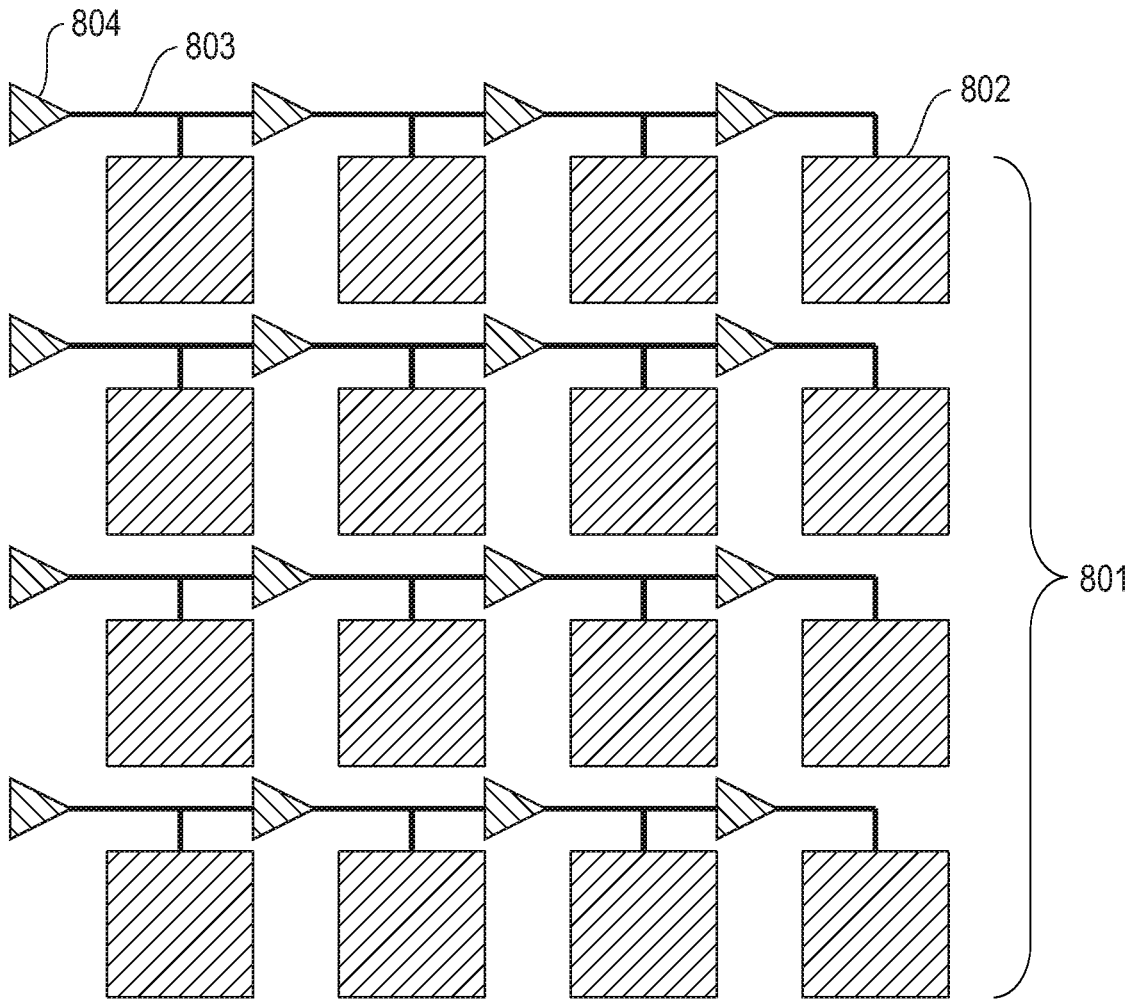
FIGS. 8A-C illustrate an exemplary row/column shifter network topology according to embodiments of the present disclosure.
Figure 8B:
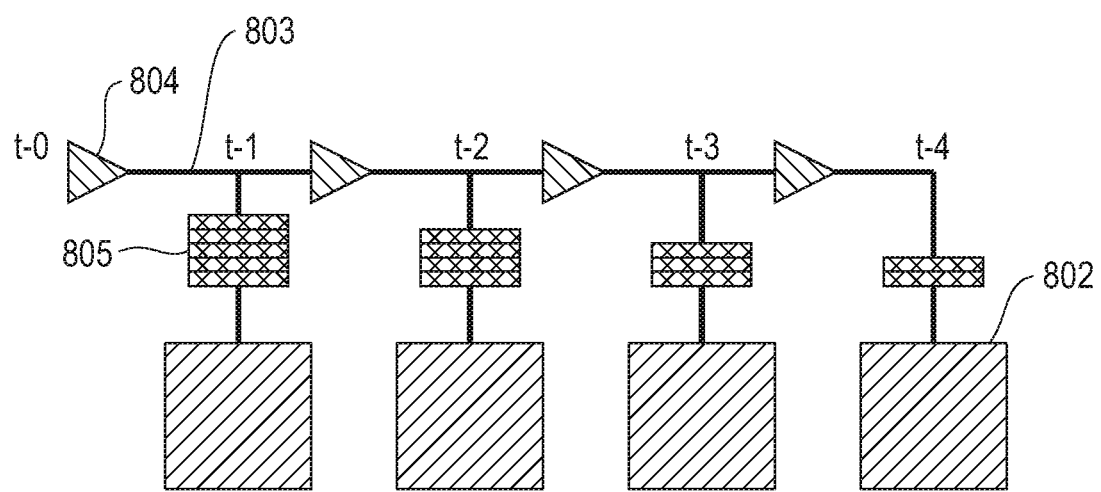
Figure 8C:
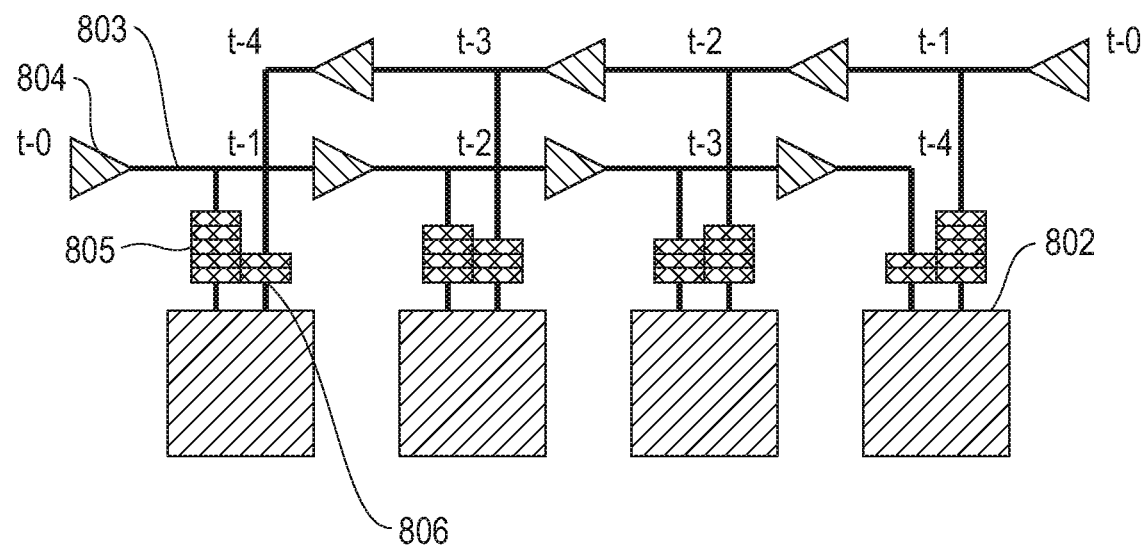

Referring to FIGS. 8A-C, an exemplary systolic row/column shifter network topology is illustrated according to embodiments of the present disclosure. In this exemplary embodiment, core array 801 includes cores 802, which are interconnected by networks 803. In some embodiments, networks 803 include buffers 804.

A row/column shifter network may be configured for broadcast, where multiple cores need the same message (at the same or different times). In such embodiments, parameters are sent serially or in parallel on a link that sequentially targets a set of cores on a row at a time, then is shifted to the next set. For parameters to arrive simultaneously, queues are needed in all but the last cores to receive the message; for a N×N grid of cores N different messages can be sent simultaneously, 1 per row.

A row/column shifter network may be configured for targeted message delivery, where each message is targeted for a single core (a message may be sent more than once to target multiple cores). In such embodiments, parameters are sent serially or in parallel on a link that sequentially targets a set of cores on a row at a time, then is shifted to the next set. For parameters to arrive simultaneously queues are needed in all but the last cores to receive the message; for a N×N grid of cores N different messages can be sent simultaneously, 1 per row. To target a core, an address is used.

This exemplary network delivers up to 1 message/cycle with latency proportional to $N^{1/2}$ for N total cores arranged as $N^{1/2}$ rows by $N^{1/2}$ columns (that is, latency depends on wire speeds). This network configuration enables buffering (introducing latency) every M cores reducing latency to $N^{1/2}/M$. This network configuration enables broadcast to all cores in a row. In some embodiments, a control is provided at every destination to filter messages.

In some embodiments, a buffer 805 is provided in each core to allow delivery of messages at the same cycle. In some embodiments, two buffers 805, 806 are provided and buffering per core is equalized by sending half of the bits from the left and half from the right.

This configuration is particularly useful for delivering the same parameters to all/many cores in each row, especially for convolutional networks where the same filter is applied to all spatial location. By delivering different messages to each row, more messages can be delivered per cycle.

Accordingly, the present disclosure provides a variety of network configurations suitable for communicating parameters and input/activation data to an array of neural network cores. In some embodiments, the parameters are broadcast to all cores. In some embodiments, the parameters are targeted to a subset of cores. In some embodiments, the network scheme is a tree. In some embodiments, the network scheme is a row/column bus. In some embodiments, the network scheme is a row/column tree. In some embodiments, the network scheme is a row/column shifter. In some embodiments, the network scheme is a mesh. In some embodiments, the input/activation data is broadcast to all cores. In some embodiments, the input/activation data is targeted to a subset of cores.

Figure 9:
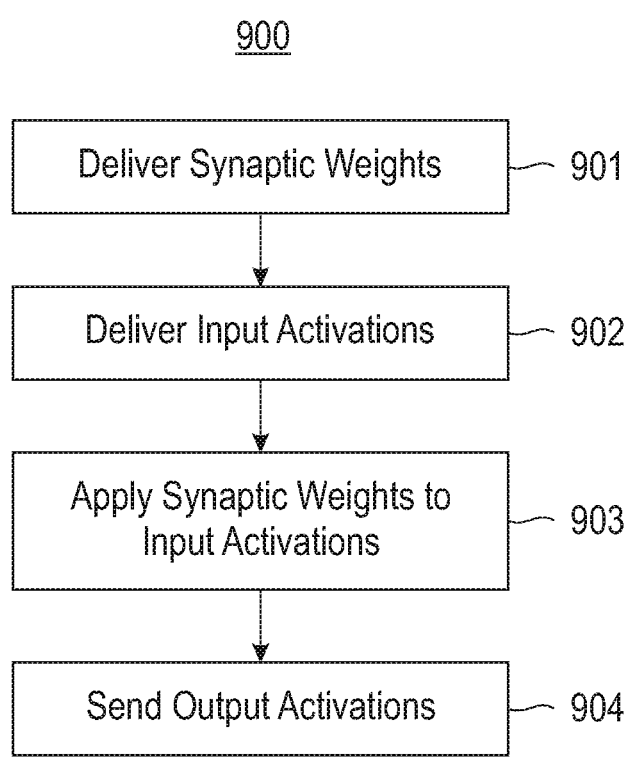
FIG. 9 illustrates a method of distributing parameters and data to neural network compute cores according to embodiments of the present disclosure.

Referring now to FIG. 9, a method of distributing parameters and data to neural network compute cores is illustrated according to embodiments of the present disclosure. At 901, synaptic weights are simultaneously delivered by at least one network of a neural inference chip to a plurality of neural cores of the neural inference chip. At 902, input activations are simultaneously delivered by at least one network of a neural inference chip to a plurality of neural cores of the neural inference chip. At 903, a plurality of synaptic weights is applied to a plurality of input activations by each of the plurality of neural cores to produce a plurality of output activations. At 904, the output activations are sent via the at least one network.

Figure 10:
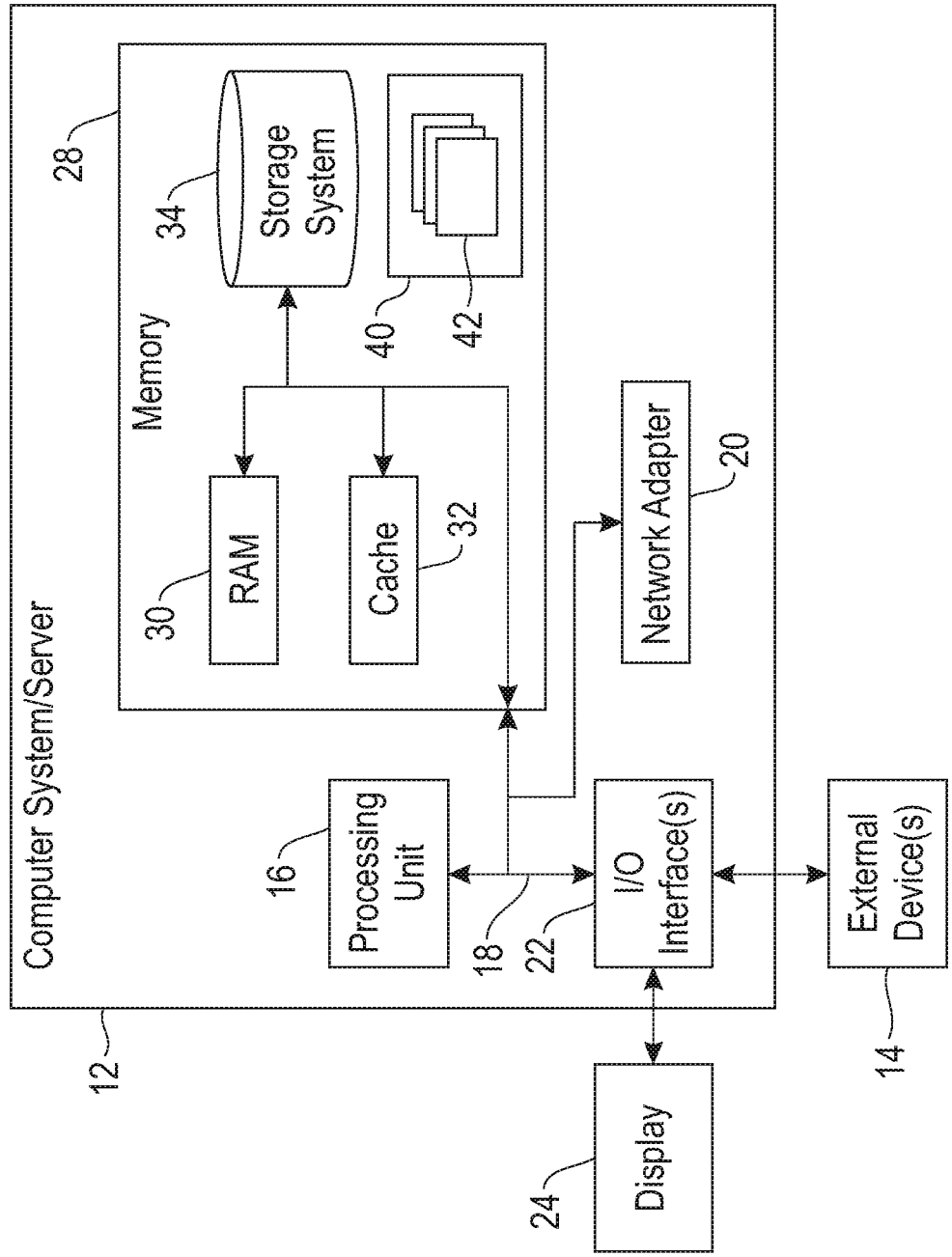
FIG. 10 depicts a computing node according to an embodiment of the present disclosure.

Referring now to FIG. 10, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A neural inference chip comprising:
a plurality of neural cores,
  each of the plurality of neural cores adapted to apply a plurality of synaptic weights to a plurality of input activations to produce a plurality of output activations;
at least one network interconnecting the plurality of neural cores,
  the at least one network adapted to simultaneously deliver synaptic weights and activation function parameters, and simultaneously deliver input activations to the plurality of neural cores based on an arrangement of the plurality of neural cores; and
a plurality of queues, each queue of the plurality of queues associated with one of the plurality of neural cores,
  the plurality of queues adapted to receive the synaptic weights and activation function parameters and facilitate the simultaneous delivery of the synaptic weights and activation function parameters.

2. The neural inference chip of claim 1, wherein the plurality of cores is organized in a grid of two or more dimensions with at least one row and at least one column.

3. The neural inference chip of claim 2, wherein the at least one network comprises a row or column bus.

4. The neural inference chip of claim 2, wherein the at least one network comprises a row or column tree.

5. The neural inference chip of claim 2, wherein the at least one network comprises a systolic row or column shifter.

6. The neural inference chip of claim 5, wherein the systolic row or column shifter is adapted to deliver a data tensor or block sequentially to cores coupled to the systolic row or column shifter.

7. The neural inference chip of claim 6, wherein the data tensor or block comprises neural network input activations, intermediate activations, and/or parameters.

8. The neural inference chip of claim 5, wherein the at least one network comprises at least two systolic row or column shifters configured to send data from opposite directions in the at least one network.

9. The neural inference chip of claim 2, wherein the grid comprises a mesh.

10. The neural inference chip of claim 9, wherein the mesh is adapted to communicate data between cores in cardinal directions.

11. The neural inference chip of claim 1, wherein the at least one network comprises a plurality of branches arranged in a tree network topology, and buffers disposed at each of the plurality of branches.

12. The neural inference chip of claim 1, wherein the at least one network comprises a plurality of branches arranged in a tree network topology, and routing controls disposed at each of the plurality of branches.

13. The neural inference chip of claim 1, wherein the at least one network is adapted to deliver intermediate results among the plurality of cores.

14. The neural inference chip of claim 13, wherein intermediate results comprise partial sums.

15. The neural inference chip of claim 14, wherein the partial sums comprise weighted sums of a subset of inputs.

16. The neural inference chip of claim 1, wherein the at least one network comprises a broadcast network.

17. The neural inference chip of claim 16, wherein the broadcast network is adapted to deliver a data tensor or block to all cores coupled to the broadcast network.

18. The neural inference chip of claim 17, wherein the data tensor or block comprises neural network input activations, intermediate activations, and/or parameters.

19. The neural inference chip of claim 1, wherein the at least one network comprises a multicast network.

20. The neural inference chip of claim 19, wherein the multicast network is adapted to deliver a data tensor or block to a subset of cores coupled to the broadcast network.

21. The neural inference chip of claim 20, wherein the data tensor or block comprises neural network input activations, intermediate activations, and/or parameters.

22. A method comprising:
by at least one network of a neural inference chip,
    simultaneously delivering synaptic weights and activation function parameters, and simultaneously delivering input activations to a plurality of neural cores of the neural inference chip;
by each of the plurality of neural cores,
    applying a plurality of synaptic weights to a plurality of input activations to produce a plurality of output activations, and sending the output activations via the at least one network; and
by a plurality queues, each of the plurality of queues being associated with one of the plurality of neural cores,
    receiving the synaptic weights and activation function parameters, and
    facilitating the simultaneous delivery of the synaptic weights and activation function parameters.

* * * * *